United States Patent
Tae et al.

(10) Patent No.: US 8,264,201 B2
(45) Date of Patent: Sep. 11, 2012

(54) BATTERY MANAGEMENT SYSTEM AND DRIVING METHOD THEREOF

(75) Inventors: Yongjun Tae, Yongin-si (KR); Andre Boehm, Stuttgart (DE)

(73) Assignee: SB LiMotive Co., Ltd., Yongin-si (KR)

( * ) Notice: Subject to any disclaimer, the term of this patent is extended or adjusted under 35 U.S.C. 154(b) by 276 days.

(21) Appl. No.: 12/840,040

(22) Filed: Jul. 20, 2010

(65) Prior Publication Data

US 2011/0181246 A1    Jul. 28, 2011

(30) Foreign Application Priority Data

Jan. 26, 2010   (KR) .......................... 10-2010-0007045

(51) Int. Cl.
*H02J 7/00* (2006.01)
*G01N 27/416* (2006.01)
*G08B 21/00* (2006.01)

(52) U.S. Cl. ........ 320/118; 320/132; 320/134; 320/138; 324/426; 340/636.1; 340/636.21

(58) Field of Classification Search .................... 320/118
See application file for complete search history.

(56) References Cited

U.S. PATENT DOCUMENTS

| | | | |
|---|---|---|---|
| 5,982,143 A | 11/1999 | Stuart | |
| 7,634,369 B2 * | 12/2009 | Lim et al. | 702/63 |
| 7,728,555 B2 * | 6/2010 | Seo et al. | 320/132 |
| 2007/0257642 A1 * | 11/2007 | Xiao et al. | 320/134 |
| 2008/0278115 A1 * | 11/2008 | Huggins | 320/134 |
| 2009/0015206 A1 * | 1/2009 | Seman et al. | 320/134 |
| 2009/0096419 A1 | 4/2009 | White et al. | |
| 2011/0184677 A1 * | 7/2011 | Tae et al. | 702/63 |

FOREIGN PATENT DOCUMENTS

| | | |
|---|---|---|
| JP | 2001-116811 A | 4/2001 |
| JP | 2002-025628 | 1/2002 |
| JP | 2002-050410 A | 2/2002 |
| JP | 2002-101565 | 4/2002 |
| JP | 2003-282155 | 10/2003 |
| JP | 2007-085847 A | 4/2007 |

(Continued)

OTHER PUBLICATIONS

Japanese Office action dated Jun. 5, 2012, for corresponding Japanese Patent application 2010-132386, (2 pages).

(Continued)

*Primary Examiner* — Yalkew Fantu
(74) *Attorney, Agent, or Firm* — Christie, Parker & Hale, LLP

(57) ABSTRACT

A battery management system and a driving method thereof are provided for detecting a short battery cell. The battery management system includes a main control unit (MCU) and a cell balancing unit. The MCU transmits a battery cell control signal for controlling charge and discharge of the battery cells. The cell balancing unit balances the battery cells according to the battery cell control signal. The MCU includes a cell balancing discharge amount measurement unit and a controller. The cell balancing discharge amount measurement unit measures a cell balancing discharge amount of each of the battery cells. The controller compares a difference value between a maximum value among the cell balancing discharge amounts of the battery cells and each of the cell balancing discharge amounts to determine a short battery cell.

10 Claims, 3 Drawing Sheets

FOREIGN PATENT DOCUMENTS

| | | |
|---|---|---|
| JP | 2007-330003 | 12/2007 |
| JP | 2009-133676 A | 6/2009 |
| WO | WO 2006/078850 A2 | 7/2006 |
| WO | WO 2008/055505 A1 | 5/2008 |

OTHER PUBLICATIONS

Patent Abstracts of Japan, and English machine translation of Japanese Publication 2002-025628, (11 pages).

Patent Abstracts of Japan, and English machine translation of Japanese Publication 2002-101565, (21 pages).

Espacenet English Abstract, and English machine translation of Japanese Publication 2003-282155, (12 pages).

Machine English Translation of JP 2001-116811 A.

Machine English Translation of JP 2002-050410 A.

Machine English Translation of JP 2007-085847 A.

Machine English Translation of JP 2009-133676 A.

KIPO Notice of Allowance dated Jul. 20, 2011 for KR 10-2010-0007045 (5 pages).

Patent Abstracts of Japan and English Machine Translation of Japanese Publication No. 2007-330003.

European Search Report dated Feb. 28, 2011, for corresponding European Patent application 10171352.7.

* cited by examiner

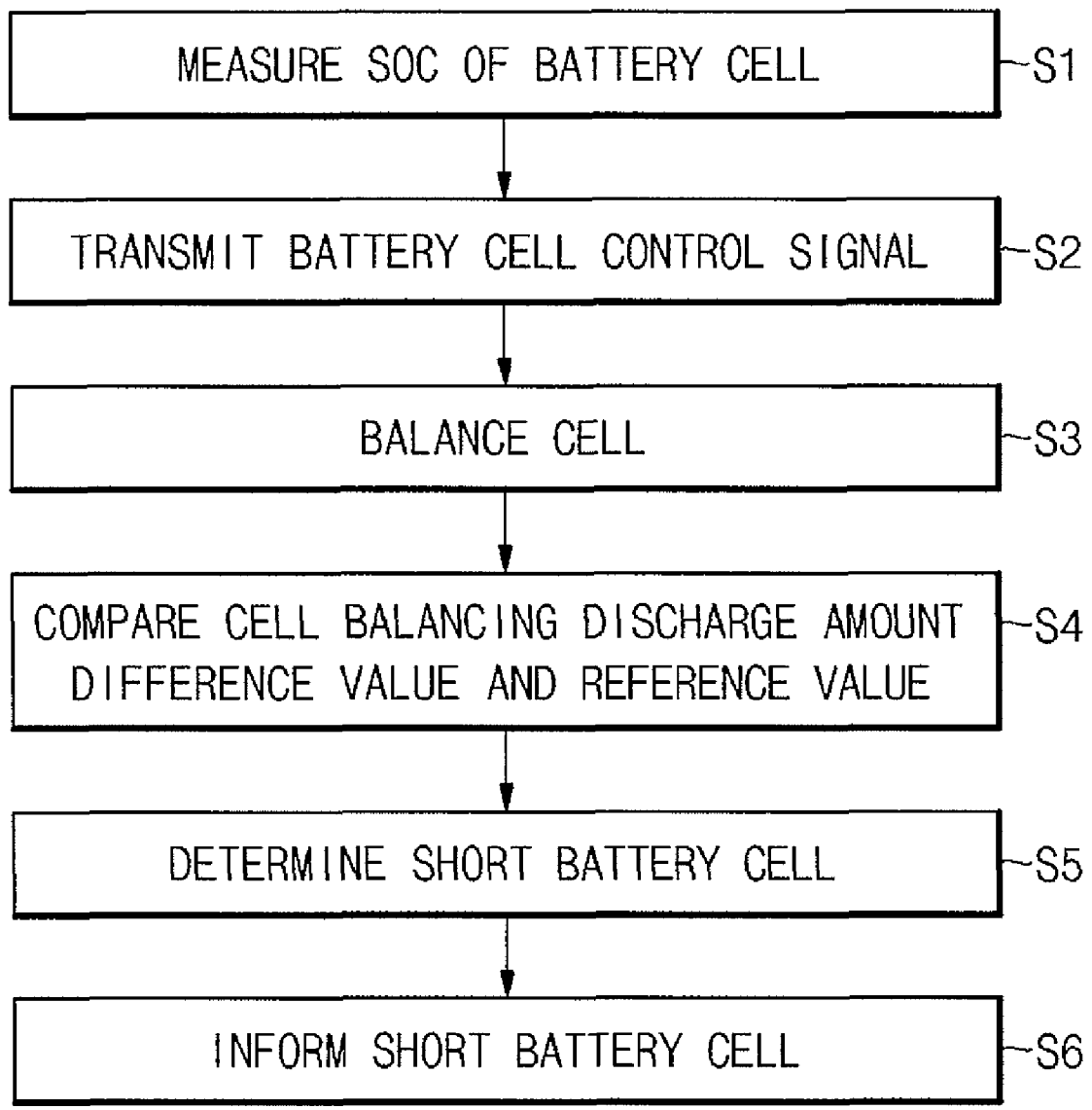

BATTERY MANAGEMENT SYSTEM AND DRIVING METHOD THEREOF

CROSS-REFERENCE TO RELATED APPLICATION

This application claims priority to and the benefit of Korean Patent Application No. 10-2010-0007045, filed on Jan. 26, 2010 in the Korean Intellectual Property Office, the disclosure of which is incorporated herein by reference.

BACKGROUND

1. Field

Aspects of embodiments of the present invention relate to a battery management system and a driving method thereof.

2. Description of the Related Art

Vehicles with a combustion engine, which uses gasoline or diesel as a main fuel, generate pollution such as air pollution. Accordingly, an electric vehicle or a hybrid vehicle is being developed for reducing the generation of pollution.

The electric vehicle has an engine that is driven by an electric energy outputted from a battery. Such an electric vehicle uses a battery, in which a plurality of dischargeable/chargeable battery cells are included in one pack, as a main power source. Therefore, the electric vehicle does not generate an exhaust gas and produces less noise.

The hybrid vehicle is powered by two or more kinds of power sources, for example, a combustion engine and an electric motor. For example, a hybrid vehicle has been developed to be powered by a combustion engine and a fuel cell which directly provides an electric energy by a chemical reaction of oxygen and hydrogen, or powered by a battery and a fuel cell.

In this way, since a vehicle running on an electric energy is directly affected by the performance of a battery cell, a Battery Management System (BMS) is utilized to measure the voltage and current of each battery cell and the total voltages and currents of all battery cells to efficiently manage the discharge/charge of each battery cell. In addition, the BMS detects a battery cell having decreased performance among the battery cells and allows each battery cell to have a high or maximum performance.

SUMMARY

Aspects of embodiments of the present invention are directed toward a battery management system and a driving method thereof, which can detect a short battery cell from among a plurality of battery cells by using the cell balancing discharge amount of the battery cell.

According to one embodiment, a battery management system includes: a sensing unit for measuring a cell voltage and a cell current of each of a plurality of battery cells; a Main Control Unit (MCU) for measuring a State Of Charge (SOC) of each of the battery cells by using the cell voltage and the cell current of each of the battery cells and transmitting a battery cell control signal for controlling charge and discharge; and a cell balancing unit for balancing the battery cells according to the battery cell control signal, wherein the MCU includes: a cell balancing discharge amount measurement unit for measuring a cell balancing discharge amount of each of the battery cells; and a controller for comparing a difference value between a maximum value among the cell balancing discharge amounts of the battery cells and each of the cell balancing discharge amounts to determine a short battery cell in which the difference value is greater than a reference value from among the battery cells.

The battery management system may further include a storage unit for storing the cell balancing discharge amount of each of the battery cells, and the reference value may be provided to the MCU.

The cell balancing discharge amount of each of the battery cells may be accumulated and stored in the storage unit.

The cell balancing unit may be configured to discharge a corresponding one of the battery cells according to the battery cell control signal.

The battery management system may further include an Electrical Controller Unit (MCU), wherein the MCU may configured to transmit information of the short battery cell to the ECU, and the ECU may be configured to display the information of the battery cell on a display device.

According to another embodiment, a driving method of a battery management system includes: measuring an SOC of each of a plurality of battery cells; transmitting a battery cell control signal for controlling the plurality of battery cells; balancing the battery cells according to the battery cell control signal; comparing a difference value between a maximum value among cell balancing discharge amounts of the battery cells and each of the cell balancing discharge amounts; and determining a short battery cell in which the difference value is greater than a reference value from among the battery cells.

In the comparing of the difference value, the discharge amount of each of the battery cells may be accumulated.

The transmitting of the battery cell control signal may include: comparing the SOC of each of the battery cells and an average SOC, and transmitting information of a battery cell of the battery cells having an SOC greater than the average SOC.

The balancing of the battery cells may include discharging a corresponding one of the battery cells in accordance with the battery cell control signal.

The driving method may further include informing the short battery cell to allow information of the short battery cell to be displayed.

According to another embodiment, a battery management system includes: a controller for transmitting a control signal for controlling charge and discharge of a plurality of battery cells; and a cell balancing unit for balancing the battery cells according to the control signal. The controller is configured to measure a cell balancing discharge amount of each of the battery cells and compare a difference value between a maximum value among the cell balancing discharge amounts of the battery cells and each of the cell balancing discharge amounts to determine a short battery cell in which the difference value is greater than a reference value among the battery cells.

The controller may include a cell balancing discharge amount measurement unit for measuring the cell balancing discharge amount of each of the battery cells.

The controller may be configured to measure a State Of Charge (SOC) of each of the battery cells by using a cell voltage and a cell current of each of the battery cells.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings:

FIG. 4 is a flow chart illustrating a driving method of a battery management system according to an embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the embodiments of the present invention to those skilled in the art.

In this disclosure below, when one part (or element, device, etc.) is referred to as being "connected" or "coupled" to another part (or element, device, etc.), it should be understood that the former can be "directly connected" to the latter, or "electrically connected" to the latter via an intervening part (or element, device, etc.). Furthermore, when it is described that one comprises (or includes or has) some elements, it should be understood that it may comprise (or include or has) only those elements, or it may comprise (or include or have) other elements as well as those elements if there is no specific limitation.

Hereinafter, embodiments of the present invention will be described in more detail with reference to the accompanying drawings.

Figure 1:
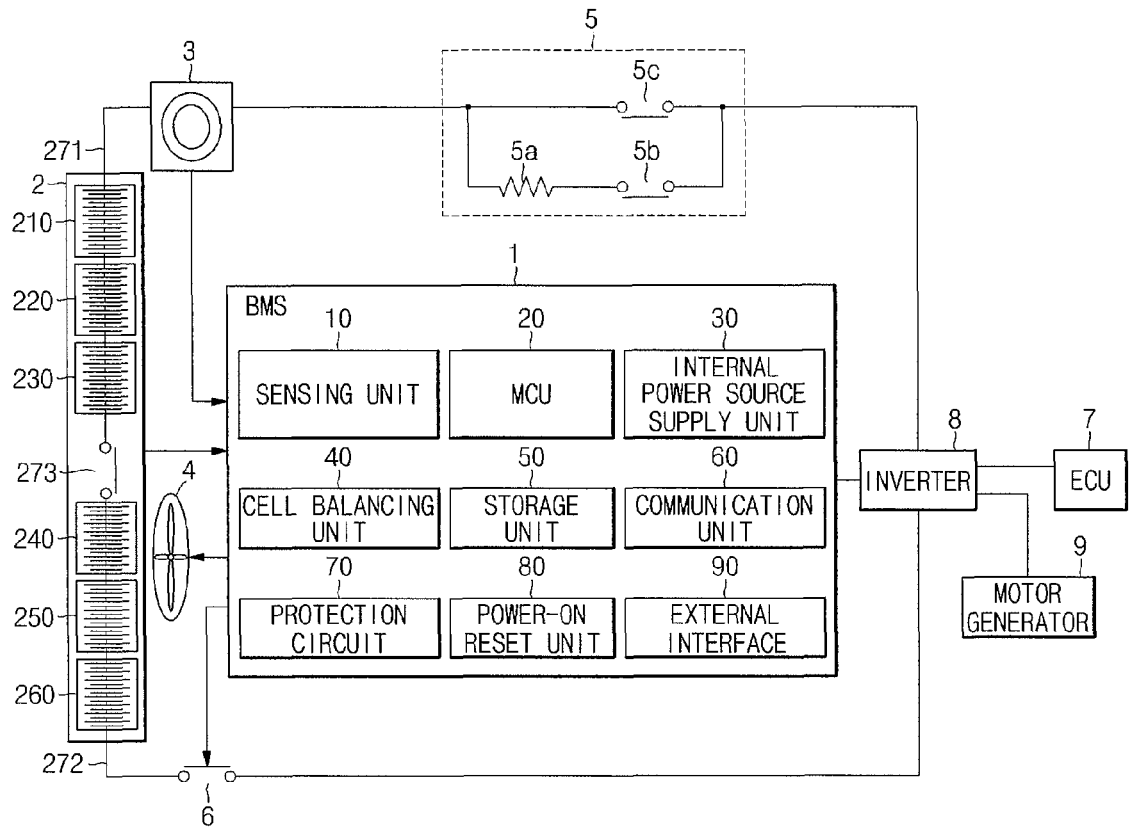
FIG. 1 is a diagram schematically illustrating a battery, a battery management system and devices peripheral to the battery management system, according to an embodiment.

FIG. 1 is a diagram schematically illustrating a battery, a battery management system and devices peripheral to the battery management system, according to an embodiment.

Referring to FIG. 1, a vehicle includes a Battery Management System (BMS) 1, a battery 2, a current sensor 3, a cooling fan 4, an inrush current prevention unit 5, a main switch 6, an Electric Controller Unit (ECU) 7, an inverter 8, and a motor generator 9.

Initially, peripheral devices connected to the front of the BMS 1 will be described below.

The battery 2 includes a plurality of sub-packs 210, 220, 230, 240, 250 and 260 connected in series, output ports 271 and 272, and a safety switch 273 connected between the sub-packs 230 and 240.

The sub-packs 210, 220, 230, 240, 250 and 260 are exemplarily illustrated as six sub-packs, and are referred to as a first sub-pack 210, a second sub-pack 220, a third sub-pack 230, a fourth sub-pack 240, a fifth sub-pack 250 and a sixth sub-pack 260. In FIG. 1, each of the first to six sub-packs 210 to 260 includes eight chargeable battery cells that are connected in series, and the battery 2 includes a total of forty-eight battery cells, but exemplary embodiments are not limited thereto. Here, each sub-pack includes a plurality of battery cells as one group. In some embodiments, the battery 2 may be configured by directly connecting the forty-eight battery cells without dividing the first to sixth sub-packs 210 to 260 into groups.

The output ports 271 and 272 are connected to the inverter 8 and motor generator 9 of the vehicle to supply an electric energy to an engine of the vehicle.

The safety switch 273 is one that is connected between the third and fourth sub-packs 230 and 240, and is a switch that is manually turned on/off for a worker's safety when changing the battery 2 or performing work on the battery 2. In an embodiment, the safety switch 273 is connected between the third and fourth sub-packs 230 and 240, but it is not limited thereto. In one embodiment, a fuse may be connected to the safety switch 273 in series. The fuse prevents (or protects from) an over current from being applied to the battery 2 due to a short circuit. That is, when an over current is generated, the fuse is disconnected and thus prevents (or protects from) the over current from being applied to the battery 2.

The current sensor 3 measures the amount of output current of the battery 2 and outputs the measured current amount to a sensing unit 10 of the BMS 1. In one embodiment, the current sensor 3 may be a hall current transformer that measures a current using a hall device to output an analog current signal corresponding to the measured current.

The cooling fan 4 reduces heat that may be generated by the discharge/charge of the battery 2 according to the control signal of the BMS 1, thereby preventing (or protecting) the battery 2 from being deteriorated and the decrease of discharge/charge efficiency due to a temperature rise.

The inrush current prevention unit 5 is located between the battery 2 and the inverter 8. The inrush current prevention unit 5 prevents (or protect from) an inrush current from being applied from the battery 2 to the inverter 8, thereby preventing (or protecting from) the damage of the inverter 8 by the inrush current. In one embodiment, the inrush current prevention unit 5 includes a precharge resistor 5a, a precharge relay 5b, and a main relay 5c. Here, the precharge relay 5b is first turned on, and the inrush current is suppressed by the precharge resistor 5a and is slowly applied to the inverter 8. Subsequently, the precharge relay 5b is turned off, and the main relay 5c is turned on, and thus, a current is stably applied from the battery 2 to the inverter 8.

When an abnormal condition such as an over voltage, an over current and high temperature occurs, the main switch 6 turns on/off the battery 2 according to the control signal of the ECU 7 of the vehicle or the BMS 1.

The BMS 1 includes the sensing unit 10, a Main Control Unit (MCU) 20, an internal power source supply unit 30, a cell balancing unit 40, a storage unit 50, a communication unit 60, a protection circuit 70, a power-on reset unit 80, and an external interface 90.

The sensing unit 10 is electrically connected to a plurality of battery cells of the battery 2. The sensing unit 10 measures the total pack currents and pack voltages of the battery 2 and the cell voltage, cell current, cell temperature and peripheral temperature of each of the battery cells and transfers the measured currents and voltages to the MCU 20.

The MCU 20 estimates the State Of Charging (SOC) and State Of Health (SOH) of the battery 2 on the basis of digital data corresponding to the total pack currents and pack voltages of the battery 2 and the cell voltage, cell current, cell temperature and peripheral temperature of each of the battery cells that are transferred from the sensing unit 10 to control the charge/discharge of the battery 2. Here, the MCU 20 calculates the Open Circuit Voltage (OCV) of each of the battery cells with the cell voltage and cell current of each of the battery cells, and measures the SOC of each of the battery cells with the OCV. The MCU 20 detects a short battery cell from among the plurality of battery cells by using the differences in SOC values between the battery cells, and transfers the information of the short battery cell to the ECU 7. Here, the short battery cell refers to a battery cell in which a positive electrode and a negative electrode are electrically connected in the inside and thereby a voltage of the short battery cell decreases. For example, when a positive electrode active material or a negative electrode active material pierces and does damage to an insulating separator that is interposed between the positive electrode and the negative electrode, this may result in a momentary short circuit in which the voltage of the battery cell is momentarily reduced.

The internal power source supply unit 30 is a device that supplies a power source to the BMS 1 by using a secondary battery.

The cell balancing unit 40 balances the charge state of each battery cell. That is, the cell balancing unit 40 may discharge a battery cell having a relatively high charge state, and may charge a battery cell having a relatively low charge state.

The storage unit 50 stores data such as a current SOC or SOH when the power source of the BMS 1 is turned off. In one embodiment, the storage unit 50 stores a cell balancing discharge amount "CB_n" (where n is a natural number) that is measured by a cell balancing discharge amount measurement unit 23 (e.g., shown in FIG. 2). Here, the storage unit 50 is a nonvolatile memory device in which data may electrically be written and read, and may be an Electronically Erasable Programmable Read Only Memory (EEPROM) or other suitable nonvolatile memory devices.

The communication unit 60 communicates with the controller of the power generating apparatus of the vehicle.

The protection circuit 70 is a circuit for protecting the BMS 1 from an external impulse, an over current and/or a low voltage and, in one embodiment, is programmed with a firmware.

The power-on reset unit 80 resets an entire system when the power source of the BMS 1 is turned on.

The external interface 90 is a device for connecting the devices peripheral to the BMS 1 such as connecting the cooling fan 4 and the main switch 6 to the MCU 20. In an embodiment, although only the cooling fan 4 and the main switch 6 are illustrated, it is not limited thereto.

The ECU 7 determines a degree of torque on the basis of information such as the accelerator and brake of a vehicle and the speed of the vehicle, and controls the output of the motor generator 9 to be in accordance with the determined torque information. That is, the ECU 7 controls the switching of the inverter 8 in order for the output of the motor generator 9 to be controlled in accordance with the determined torque information. Here, the ECU 7 receives the SOC of the battery 2 that is transferred from the MCU 20 through the communication unit 60 of the BMS 1 and controls the SOC of the battery 2 to have a target value (for example, about 55%). For example, when the SOC transferred from the MCU 20 is equal to or less than about 55%, the ECU 7 controls the switching of the inverter 8 to allow a power to be outputted toward the battery 2, thereby charging the battery 2. At this point, a pack current "I" may have a positive (+) value. When the SOC is equal to or greater than about 55%, the ECU 7 controls the switching of the inverter 8 to allow a power to be outputted toward the motor generator 9, thereby discharging the battery 2. At this point, a pack current "I" may have a negative (−) value. Furthermore, the ECU 7 receives the SOH of the battery 2 that is transferred from the MCU 20 through the communication unit 60 of the BMS 1 and allows the SOH to be displayed on a display device such as the dashboard of the vehicle, thereby enabling a user to check the SOH. In addition, the ECU 7 receives the information of a short battery cell from the MCU 20 and allows the received information to be displayed on the display device, thereby enabling the user to check the information on the short battery cell.

The inverter 8 allows the battery 2 to be charged/discharged according to the control signal of the ECU 7.

The motor generator 9 drives the vehicle in accordance with the torque information, which is transferred from the ECU 7, with the electric energy of the battery 2.

Figure 2:
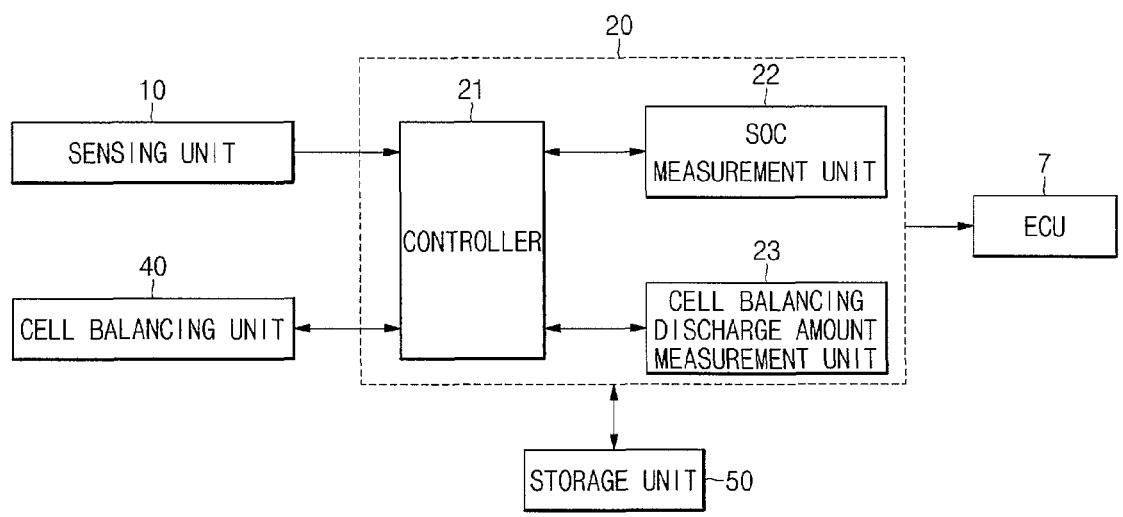
FIG. 2 is a diagram illustrating the detailed configuration of a Main Control Unit (MCU) in FIG. 1.

FIG. 2 is a diagram illustrating a detailed configuration of the MCU in FIG. 1, according to one embodiment.

Referring to FIG. 2, the MCU 20 includes a controller 21, an SOC measurement unit 22, and the cell balancing discharge amount measurement unit 23.

The controller 21 transmits the cell voltage and cell current of each of the battery cells, which are inputted from the sensing unit 10, to the SOC measurement unit 22 and allows the SOC measurement unit 22 to measure the SOC of each battery cell at certain time. The controller 21 calculates the average SOC of the battery cell that is measured by the SOC measurement unit 22, and compares the average SOC with the measured SOC of each battery cell. The controller 21 transfers a battery cell control signal including the information of the battery cell, which has a measured SOC greater than the average SOC, to the cell balancing unit 40. The cell balancing unit 40 receiving the battery cell control signal performs the cell balancing of a corresponding battery cell. At this point, the cell balancing unit 40 discharges a battery cell having an SOC greater than the average SOC. Cell balancing may be performed several times. The time of cell balancing may be a time when a vehicle is in a key-off state (e.g., key removed or in off position) or is temporarily stopped, but it is not limited thereto.

The controller 21 transmits the SOC of each battery cell, which is discharged through cell balancing, to the cell balancing discharge amount measurement unit 23, and allows the cell balancing discharge amount measurement unit 23 to measure the cell balancing discharge amount "CB_n" of each battery cell. Data measured by the cell balancing discharge amount measurement unit 23 are accumulated and stored in the storage unit 50. The accumulated cell balancing discharge amount "CB_n" of each battery cell is used as a parameter for detecting a short battery cell from among the plurality of battery cells.

The controller 21, as expressed in Equation (1), compares whether a difference value "CB_max−CB_n" between the maximum value "CB_max" among the cell balancing discharge amounts "CB_n" of the battery cells and the cell balancing discharge amount "CB_n" of each battery cell is greater than a reference value "REF," on the basis of the cell balancing discharge amount "CB_n" that is measured by the cell balancing discharge amount measurement unit 23 and is stored in the storage unit 50. Here, the cell balancing discharge amount of a first battery cell may be referred to as "CB_1," and the cell balancing discharge amount of a second battery cell may be referred to as "CB_2."

$$\text{CB\_max} - \text{CB\_}n > \text{REF} \tag{1}$$

The controller 21 determines a battery cell having the difference value "CB_max−CB_n" greater than the reference value "REF" among the plurality of battery cells as a short battery cell through Equation (1). The reason is as follows. In the case of a short battery cell, discharge by cell balancing is not performed because continuous discharge is not performed due to internal short, and therefore, the cell balancing discharge amount "CB_n" of the short battery cell has a very small value. Accordingly, a difference value between the maximum value "CB_max" of the cell balancing discharge amount of a battery cell and the cell balancing discharge amount of a short battery cell is relatively greater than the difference value of the cell balancing discharge amount of another battery cell (i.e., a battery cell that is not a short battery cell).

The SOC measurement unit 22 may calculate the OCV of each battery cell by using the cell voltage and cell current of each battery cell that are inputted from the sensing unit 10 through the controller 21, and may measure the SOC of each battery cell with the OCV. Here, when the SOC measurement unit 22 measures the SOC of each battery cell and transmits the measured SOC to the controller 21, the controller 21 stores the measured SOC in the data storage unit 50. The SOC of the battery cell may be measured by many other suitable methods. In exemplary embodiments, a method of measuring the SOC of the battery cell is not limited to the above described method.

The cell balancing discharge amount measurement unit 23 may measure the cell balancing discharge amount "CB_n" of each battery cell by using the SOC of each battery cell in which cell balancing is performed by the cell balancing unit 40. Here, the cell balancing discharge amount measurement unit 23 measures the cell balancing discharge amount "CB_n" of each battery cell and transmits the measured value to the controller 21, and the controller 21 stores the measured value in the storage unit 50. At this point, the cell balancing discharge amount "CB_n" of each battery cell is accumulated and stored in the storage unit 50.

The following description will be made on a simulation showing that the MCU 20 can detect a short battery cell from among the plurality of battery cells through Equation (1).

Figure 3:
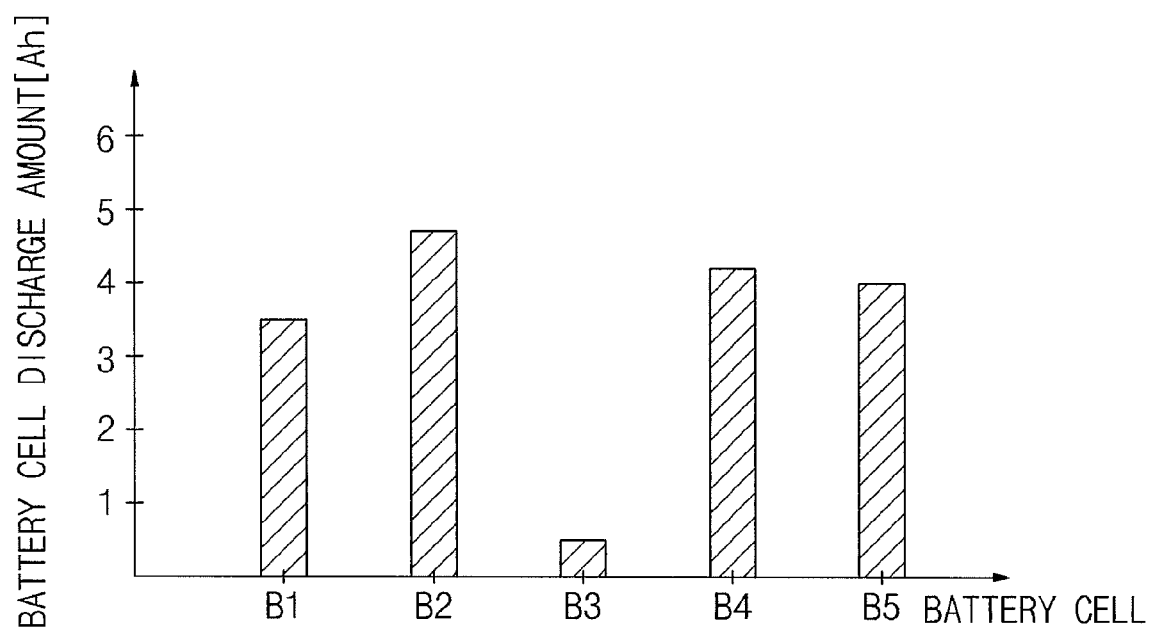
FIG. 3 is a graph displaying the cell balancing discharge amount of each of a plurality of battery cells which is measured by the MCU of FIG. 2.

FIG. 3 is a graph displaying the cell balancing discharge amount of each of the plurality of battery cells which is measured by the MCU of FIG. 2.

In FIG. 3, a graph shows the cell balancing discharge amount of each battery cell, and B1 to B5 represent a plurality of battery cells. Here, it is assumed that the cell balancing of each battery cell is at least performed one times. In one embodiment, the cell balancing discharge amount "CB_n" of each battery cell is a value that is obtained by summing the cell balancing discharge amounts "CB_n" while cell balancing is being performed. A reference value is set as 3 Ah.

In FIG. 3, the cell balancing discharge amounts "CB_n" of B2, at 4.7 Ah, represents the maximum "CB_max." According to Equation (1), the difference value of B1, which is "4.7 Ah−3.5 Ah=1.2 Ah," is less than the reference value "3 Ah," the difference value of B2, which is "4.7 Ah−4.7 Ah=0 Ah," is less than the reference value "3 Ah," the difference value of B3, which is "4.7 Ah−0.5 Ah=4.2 Ah," is greater than the reference value "3 Ah," the difference value of B4, which is "4.7 Ah−4.2 Ah=0.5 Ah," is less than the reference value "3 Ah," and the difference value of B5, which is "4.7 Ah−4.0 Ah=0.7 Ah," is less than the reference value "3 Ah." Accordingly, it is shown that B3 is a battery cell in which the difference value "4.7 Ah−0.5 Ah=4.2 Ah" is greater than the reference value "3 Ah," i.e., a short battery cell. Consequently, it can be seen that the MCU 20 can detect a short battery cell from among the plurality of battery cells through Equation (1).

The following description will be made on a driving method of a battery management system according to an embodiment.

FIG. 4 is a flow chart illustrating a driving method of a battery management system according to an embodiment.

Referring to FIG. 4, a driving method of a battery management system according to an embodiment includes an operation S1 of measuring the SOC of a battery cell, an operation S2 of transmitting the battery cell control signal, an operation S3 of performing cell balancing, an operation S4 of comparing a cell balancing discharge amount difference value and a reference value, an operation S5 of determining a short battery cell, and an operation S6 of informing the short battery cell.

In the operation S1 of measuring the SOC of a battery cell, the SOC measurement unit 22 of the MCU 20 calculates the OCV of each battery cell by using the cell voltage and cell current of each battery cell that are inputted from the sensing unit 10 through the controller 21, and may measure the SOC of each battery cell with the OCV.

In the operation S2 of transmitting the battery cell control signal, the controller 21 compares the SOC of each battery cell that is measured by the SOC measurement unit 22 and an average SOC and transfers the battery cell control signal to the cell balancing unit 40, thereby allowing a battery cell having an SOC greater than the average SOC to be discharged.

In the operation S3 of performing cell balancing, the cell balancing unit 40 performs the cell balancing of a corresponding battery cell according to the battery cell control signal that is received from the controller 21. At this point, cell balancing performed by the cell balancing unit 40 includes discharging a battery cell having an SOC greater than the average SOC. In the operation S3 of performing cell balancing, the cell balancing discharge amounts "CB_n" of each battery cell is measured by the cell balancing discharge amount measurement unit 23 and is stored in the storage unit 50.

In the operation S4 of comparing a cell balancing discharge amount difference value and a reference value, the controller 21 compares whether or not the difference value "CB_max−CB_n" between the maximum value "CB_max" among the cell balancing discharge amounts "CB_n" of the battery cells and the cell balancing discharge amount "CB_n" of each battery cell is greater than the reference value "REF," on the basis of the cell balancing discharge amount "CB_n" that is accumulated in the storage unit 50.

In the operation S5 of determining a short battery cell, the controller 21 determines a battery cell in which the difference value "CB_max−CB_n" is greater than the reference value "REF" among the plurality of battery cells as a short battery cell, according to the comparison result of the reference value "REF" and the difference value "CB_max−CB_n" of the cell balancing discharge amounts "CB_n." When the difference value "CB_max−CB_n" is less than the reference value "REF," the controller 21 determines that a short battery cell does not exist, and the operations S1 to S4 are repeated. At this point, the cell balancing discharge amount of each battery cell is accumulated and stored in the storage unit 50 according to the number of times the operations S1 to S4 are repeated. Accordingly, the controller 21 can detect a battery cell in which internal short occurs in continuous manner.

In the operation S6 of informing the short battery cell (e.g., informing the location of the short battery cell), the MCU 20 transmits information of a short battery cell to the ECU 7, thereby allowing the information to be displayed on a display device. Then, a user can check whether a short battery cell is detected or not.

As described above, the battery management system and the driving method thereof according to exemplary embodiments detect a short battery cell from among the plurality of battery cells by using the cell balancing discharge amount of the battery cell, and inform a user of the short battery cell, thereby enabling the user to check the short battery cell. Accordingly, the battery management system and the driving method thereof according to exemplary embodiments enable one to identify and change a battery cell in which performance is degraded due to a short circuit.

Accordingly, the battery management system and the driving method thereof according to exemplary embodiments detect a short battery cell, in which continuous short circuit occurs, from among the plurality of battery cells by using the accumulated cell balancing discharge amount of the battery cell, and thus can prevent or protect the battery from exploding due to continuous short circuit.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims and their equivalents.

What is claimed is:

1. A battery management system, comprising:
    a sensing unit for measuring a cell voltage and a cell current of each of a plurality of battery cells;
    a Main Control Unit (MCU) for measuring a State Of Charge (SOC) of each of the battery cells by using the cell voltage and the cell current of each of the battery cells and transmitting a battery cell control signal for controlling charge and discharge; and
    a cell balancing unit for balancing the battery cells according to the battery cell control signal,
    wherein the MCU comprises:
        a cell balancing discharge amount measurement unit for measuring a cell balancing discharge amount of each of the battery cells; and
        a controller for comparing a difference value between a maximum value among the cell balancing discharge amounts of the battery cells and each of the cell balancing discharge amounts to determine a short battery cell in which the difference value is greater than a reference value from among the battery cells.

2. The battery management system as claimed in claim 1, further comprising a storage unit for storing the cell balancing discharge amount of each of the battery cells and the reference value.

3. The battery management system as claimed in claim 2, wherein the cell balancing discharge amount of each of the battery cells is accumulated and stored in the storage unit.

4. The battery management system as claimed in claim 1, wherein the cell balancing unit is configured to discharge a corresponding one of the battery cells according to the battery cell control signal.

5. The battery management system as claimed in claim 1, further comprising an Electric Controller Unit (ECU),
    wherein the MCU is configured to transmit information of the short battery cell to the ECU, and the ECU is configured to display the information of the battery cells on a display device.

6. A driving method of a battery management system, the driving method comprising:
    measuring a State Of Charge (SOC) of each of a plurality of battery cells;
    transmitting a battery cell control signal for controlling the plurality of battery cells;
    balancing the battery cells according to the battery cell control signal;
    comparing a difference value between a maximum value among cell balancing discharge amounts of the battery cells and each of the cell balancing discharge amounts; and
    determining a short battery cell in which the difference value is greater than a reference value from among the battery cells.

7. The driving method as claimed in claim 6, wherein in the comparing of the difference value, the discharge amount of each of the battery cells is accumulated.

8. The driving method as claimed in claim 6, wherein the transmitting of the battery cell control signal comprises:
    comparing the SOC of each of the battery cells and an average SOC, and
    transmitting information of a battery cell of the battery cells having an SOC greater than the average SOC.

9. The driving method as claimed in claim 6, wherein the balancing of the battery cells comprises discharging a corresponding one of the battery cells in accordance with the battery cell control signal.

10. The driving method as claimed in claim 6, further comprising informing the short battery cell to allow information of the short battery cell to be displayed.

* * * * *